US009007952B2

(12) United States Patent
Yan et al.

(10) Patent No.: US 9,007,952 B2
(45) Date of Patent: *Apr. 14, 2015

(54) METHOD AND DEVICE FOR SWITCHING

(71) Applicant: Huawei Technologies Co., Ltd., Shenzhen (CN)

(72) Inventors: Kun Yan, Shenzhen (CN); Xueli Ma, Shanghai (CN); Qi Liu, Shanghai (CN); Yongqiang Gao, Beijing (CN); Zongjie Wang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,786

(22) Filed: Jul. 28, 2014

(65) Prior Publication Data

US 2014/0341195 A1  Nov. 20, 2014

Related U.S. Application Data

(63) Continuation of application No. 13/282,881, filed on Oct. 27, 2011, now Pat. No. 8,824,369, which is a continuation of application No. PCT/CN2009/071493, filed on Apr. 27, 2009.

(51) Int. Cl.
*H04W 4/00* (2009.01)
*H04W 72/04* (2009.01)
(Continued)

(52) U.S. Cl.
CPC ......... *H04W 72/0406* (2013.01); *H04W 24/08* (2013.01); *H04W 36/0005* (2013.01); *H04W 36/06* (2013.01)

(58) Field of Classification Search
CPC ....................................... H04W 4/00

USPC .................. 370/252, 328, 329, 336
See application file for complete search history.

(56) References Cited

U.S. PATENT DOCUMENTS 7,945,258 B2 * 5/2011 Sollenberger et al. ........ 455/423
8,386,874 B2 * 2/2013 Pelletier et al. ............... 714/749
(Continued)

FOREIGN PATENT DOCUMENTS

| CN | 1734980 A | 2/2006 |
|---|---|---|
| CN | 101203048 A | 6/2008 |

(Continued)

OTHER PUBLICATIONS

First Chinese Office Action received in Chinese Application No. 200980123698.3, mailed Nov. 2, 2012, 19 pages.
(Continued)

*Primary Examiner* — Farah Faroul
(74) *Attorney, Agent, or Firm* — Slater & Matsil, L.L.P.

(57) ABSTRACT

A switching method and device are disclosed by the present invention. The switching method according to the embodiments of the present invention includes: receiving from a base station a switching indication information that requires a user equipment (UE) to switch a transmission time interval (TTI); sending to the base station a switching confirmation information with which the switching indication information is confirmed; and switching the TTI. The switching method according to the embodiments of the present invention includes: sending to a UE a switching indication information that requires the UE to switch a TTI; and receiving from the UE a switching confirmation information with which the switching indication information is confirmed. By using the switching method and device according to the embodiments of the present invention, the delay of switching the TTI can be shortened and the TTI can be switched quickly.

16 Claims, 6 Drawing Sheets

(51) Int. Cl.
*H04W 36/06* (2009.01)
*H04W 24/08* (2009.01)
*H04W 36/00* (2009.01)

(56) References Cited

U.S. PATENT DOCUMENTS

| | | | |
|---|---|---|---|
| 8,462,839 B2* | 6/2013 | Banna et al. | 375/232 |
| 2005/0207374 A1 | 9/2005 | Petrovic et al. | |
| 2005/0208961 A1 | 9/2005 | Willenegger | |
| 2006/0034285 A1 | 2/2006 | Pirskanen et al. | |
| 2006/0176869 A1 | 8/2006 | Cheng et al. | |
| 2007/0127369 A1 | 6/2007 | Sebire | |
| 2008/0008152 A1 | 1/2008 | Lohr et al. | |
| 2008/0056180 A1 | 3/2008 | Li et al. | |
| 2010/0027503 A1 | 2/2010 | Eravelli et al. | |
| 2010/0135473 A1 | 6/2010 | Dewing et al. | |
| 2010/0316159 A1* | 12/2010 | Bo et al. | 375/295 |
| 2011/0038352 A1 | 2/2011 | Bergman et al. | |

FOREIGN PATENT DOCUMENTS

| | | |
|---|---|---|
| CN | 101350701 A | 1/2009 |
| CN | 101394202 A | 3/2009 |
| EP | 2034757 A1 | 3/2009 |
| JP | 200753747 A | 3/2007 |
| RU | 2371871 C2 | 10/2009 |
| WO | 2007148575 A1 | 12/2007 |
| WO | 2008131262 A1 | 10/2008 |

OTHER PUBLICATIONS

3GPP TS 25.331 v8.6.0, 3rd Generation Partnership Project; Technical Specification Group Radio Access Network; Radio Resource Control (RRC); Protocol Specification (Release 8), Mar. 2009, 1673 pages.

Extended European Search Report received in Application No. 14166264, mailed Jul. 2, 2014, 9 pages.

Communication pursuant to Article 94(3) EPC received in Application No. 09 843 850.0-1857, mailed Jul. 19, 2013, 4 pages.

European Patent Communication; mailed Jun. 13, 2012; relating to the extended European search report; pursuant to Rule 62 EPC, the supplementary European search report (Art. 153(7) EPC) and the European search opinion in connection with Application No. 09843850.0-1249 for Huawei Tech Co., Ltd, 9 pages.

International Search Report for International Application No. PCT/CN2009/071493, mailed Feb. 11, 2010, Huawei Technologies Co., Ltd., 4 pages.

3GPP, "Processing Time for Applying HS-SCCH Order," R1-071019, 3GPP TSG-RAN WG1 Meeting #48, St. Louis, USA, Feb. 12-16, 2007, 2 pages.

Motorola, TSG RAN WG2 Meeting #45, R2-042356, Agenda item: 12.2 (Enhanced Uplink); "E-DCH Coverage and switching between 2ms and 10 ms TTI," Document for: Discussion and Approval., Shin-Yokohama, Japan; Nov. 15-19, 2004; 2 pages.

Lucent Technologhies, 3GPP TEG-RAN WG2#46, R2-050566; Agenda Item: 11.2; "2ms/10ms TTI switching," Document for: Discussion and Decision, Scottsdale, AZ; Feb. 14-18, 2005; 3 pages.

Notice of Reasons for Rejection received in Application No. 2012-507568, mailed Feb. 26, 2013, 7 pages.

Decision on Grant of a Patent for Invention received in Russian Application No. 2011148123/07 mailed Apr. 15, 2013, 29 pages.

Office Action received in Russian Application No. 2011148123/07, mailed Jan. 16, 2013, 10 pages.

Written Opinion of the International Searching Authority (translation) dated (mailed) Feb. 11, 2010, issued in related Application No. PCT/CN2009/071493, filed Apr. 27, 2009, Huawei Technologies Co., Ltd., 5 pages.

* cited by examiner

METHOD AND DEVICE FOR SWITCHING

This application is a continuation of U.S. patent application Ser. No. 13/282,881, filed on Oct. 27, 2011, which is a continuation of International Application No. PCT/CN2009/071493, filed on Apr. 27, 2009, The afore-mentioned patent applications are hereby incorporated by reference in their entireties.

TECHNICAL FIELD

The present invention relates generally to a system and method, and, in particular embodiments, to a system and method for.

BACKGROUND

High speed uplink packet access (HSUPA) is a technology introduced in the 3rd Generation Partnership Project (3GPP) Release 6 (R6). This technology is optimization and evolution directing to packet services in the uplink direction (direction from a mobile terminal to a radio access network). Using self-adaptation encoding, physical-layer hybrid retransmission, Node B-based fast scheduling, and 2-ms transmission time interval (TTI)-based short-frame transmission, HSUPA enhances the highest data transmission rate and cell throughput, and reduces the delay.

HSUPA further reduces the transmission delay by using the 2-ms TTI transmission mode. However, 2-ms TTI-based short-frame transmission mode is not applicable to the user equipment (UE) that works at the edge of a cell. Therefore, the coverage of the UE is narrowed down. Especially in the case of a period of time after the UE's total transmit power reaches the maximum transmit power, the 2-ms TTI needs to be switched to 10-ms TTI to enhance the uplink coverage. The detailed process is as follows:

(1) The network configures 6d event for the UE by a measuring control message.

(2) When the UE transmit power reaches the maximum allowable transmit power and stays for a period of time, the UE reports a measurement report to the network.

(3) Upon receiving the measurement report, a radio network controller (RNC) judges whether the UE uplink transmit power is limited, and sends a reconfiguration message (may include a radio bearer reconfiguration message, transmission channel reconfiguration message) to the UE to reconfigure the TTI length.

(4) Upon receiving the reconfiguration message, the UE performs the reconfiguration according to the reconfiguration message at a time specified by the network to implement switching from 2-ms TTI to 10-ms TTI.

As described above, in the prior art, the UE reports 6d event and the RNC judges, according to 6d event, whether the UE transmit power is limited, and initiates the reconfiguration message to configure the UE for TTI switching. Therefore, the delay is long when the UE switches to 10-ms TTI transmission mode.

SUMMARY OF THE INVENTION

The major objective of embodiments of the present invention is to reduce the delay of switching transmission time interval (TTI).

In order to achieve the above objective, this disclosure provides a method for switching embodied in programming stored in a computer readable storage medium. In this example, the programming includes instructions to receive a high-speed shared control channel (HS-SCCH) order carrying a switching indication information instructing a user equipment (UE) to switch a transmission time interval (TTI). The switching indication information is received from a base station. The programming further includes instructions to send to the base station a switching confirmation information, and to switch the TTI. The switching indication information is confirmed with the switching confirmation information.

This disclosure provides another method for switching that is embodied in programming stored in a computer readable storage medium. In this example, the programming includes instructions to send a high-speed shared control channel (HS-SCCH) order from a base station to a user equipment (UE). The HS-SCCH order carries a switching indication information instructing the UE to switch a transmission time interval (TTI). The programming further includes instructions to receive from the UE a switching confirmation information confirming that the UE has switched the TTI.

Based on the preceding technical solutions, in embodiments of the present invention, the base station directly instructs the UE to switch the TTI. Therefore, the notification sent from the Node B to RNC to instruct UE to switch the TTI is avoided. The delay of switching the TTI is shortened, so as to implement quick TTI switching.

BRIEF DESCRIPTION OF THE DRAWINGS

The following describes the embodiments of the present invention with reference to the accompanying drawings.

DETAILED DESCRIPTION OF ILLUSTRATIVE EMBODIMENTS

To make the technical solutions of the present invention clearer, the present invention is illustrated with reference to the accompanying drawings and embodiments.

Figure 1:
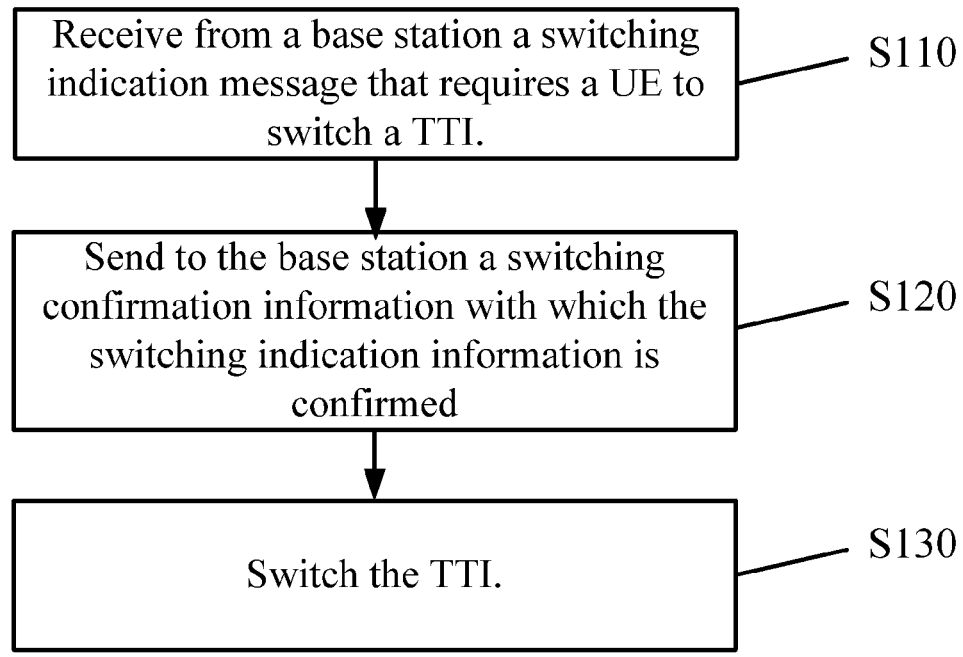
FIG. 1 is a flowchart of a method for switching according to an embodiment of the present invention.

Referring to FIG. 1, an embodiment of the present invention provides a method for switching. The method includes:

Step S110: Receive a switching indication information that requires a UE to switch a TTI and is sent from a base station.

Step S120: Send to the base station a switching confirmation information with which the switching indication information is confirmed.

Step S130: Switch the TTI.

The UE includes but not limited to the mobile phone, laptop, personal digital assistant (PDA), play station portable (PSP), and portable multimedia projector.

When the UE receives the switching indication information that requires the UE to switch the TTI, for example, when the base station requires the UE to switch from the 2-ms TTI to the 10-ms TTI, the UE sends, according to the received switching indication information, a switching confirmation information to confirm that the switching indication information is received and the TTI is to be switched. Subsequently, the UE switches the TTI, for example, switching from the 2-ms TTI to the 10-ms TTI. Accordingly, the UE may shorten the delay of switching the TTI, so as to switch the TTI quickly.

In step S110 of the embodiment, the base station may carry the switching indication information by sending a high-speed shared control channel (HS-SCCH) order or by using other proper manners.

The HS-SCCH order physical channel transmits the following contents:

1. Order types: $x_{odt,1}$, $x_{odt,2}$, $x_{odt,3}$, 3 bits
2. Order contents: $x_{ord,1}$, $x_{ord,2}$, $x_{ord,3}$, 3 bits
3. UE identifiers (IDs) $x_{ue,1}$, $x_{ue,2}$, . . . , $x_{ue,16}$, 16 bits When the base station sends an HS-SCCH order, $x_{odt,1}$, $x_{odt,2}$, $x_{odt,3}$ indicate the order types, and $x_{ord,1}$, $x_{ord,2}$, $x_{ord,3}$ indicate the order contents. The HS-SCCH order, undergoing a series of encoding processing, is notified to the UE over the radio channel. The order types and contents can be set to carry the switching indication information that requires the UE to switch the TTI.

When the order types $x_{odt,1}$, $x_{odt,2}$, $x_{odt,3}$ are set to "001", either the order content $x_{ord,1}$, or $X_{ord,2}$, or both of the order contents $x_{ord,2}$ and $x_{ord,2}$ may be set to carry the indication information. When the order types $x_{odt,1}$, $x_{odt,2}$, and $x_{odt,3}$ are set to any binary combination except "000" and "001", the order content $x_{ord,1}$, $x_{ord,2}$, or $x_{ord,3}$ or any combination of the order contents $x_{ord,1}$, $x_{ord,2}$ and $x_{ord,3}$, may be set to carry the indication information.

For example, the order types $x_{odt,1}$, $x_{odt,2}$, and $x_{odt,3}$ may be set to "001" and $x_{ord,1}$ may be set to "1" to instruct the UE to switch the TTI; and the order types $x_{odt,1}$, $x_{odt,2}$, and $x_{odt,3}$ may be set to "001" and $x_{ord,1}$ may be set to "0" to instruct the UE not to switch the TTI.

In this embodiment, the base station uses the HS-SCCH order to carry the switching indication information that requires the UE to switch the TTI. In this way, the existing resources are made full use of, the resource utilization rate is improved, the operation is simple and easy for implementation, and better compatibility with the prior art is achieved.

In step S120 of the above embodiment, the UE may carry the switching indication confirmation information by sending an enhanced dedicated transport channel (E-DCH) transport format combination indicator (E-TFCI) corresponding to a transport block (TB), which is forbidden to be used within a current TTI, on an E-DCH dedicated physical control channel (E-DPCCH).

For example, when the base station requires the UE to switch from the 2-ms TTI (current TTI) to the 10-ms TTI, in any mapping table between the E-TFCI and TB size, at least one TB is forbidden. The size of the forbidden TB is N/A. Tables 1 and 2 respectively list the mapping between the E-TFCI and TB size in case of the 2-ms TTI. In Table 1, when the E-TFCI is 120, the corresponding TB size is N/A, and the TB is forbidden. In Table 2, when the E-TFCI is 101, the TB size is N/A, and the TB is forbidden; or when the E-TFCI is 102, the TB size is N/A, and the TB is forbidden.

TABLE 1

| E-TFCI | TB Size (Bit) |
|---|---|
| 0 | 18 |
| 1 | 120 |
| 2 | 124 |
| 3 | 129 |
| 4 | 133 |
| 5 | 138 |
| 6 | 143 |
| 7 | 149 |
| 8 | 154 |
| 9 | 160 |
| 10 | 166 |
| 11 | 172 |
| 12 | 178 |
| 13 | 185 |
| 14 | 192 |
| 15 | 199 |
| 16 | 206 |
| 17 | 214 |
| 18 | 222 |
| 19 | 230 |
| 20 | 238 |
| 21 | 247 |
| 22 | 256 |
| 23 | 266 |
| 24 | 275 |
| 25 | 286 |
| 26 | 296 |
| 27 | 307 |
| 28 | 318 |
| 29 | 330 |
| 30 | 342 |
| 31 | 355 |
| 32 | 368 |
| 33 | 382 |
| 34 | 396 |
| 35 | 410 |
| 36 | 426 |
| 37 | 441 |
| 38 | 458 |
| 39 | 474 |
| 40 | 492 |
| 41 | 510 |
| 42 | 529 |
| 43 | 548 |
| 44 | 569 |
| 45 | 590 |
| 46 | 611 |
| 47 | 634 |
| 48 | 657 |
| 49 | 682 |
| 50 | 707 |
| 51 | 733 |
| 52 | 760 |
| 53 | 788 |
| 54 | 817 |
| 55 | 847 |
| 56 | 878 |
| 57 | 911 |
| 58 | 944 |
| 59 | 979 |
| 60 | 1015 |
| 61 | 1053 |
| 62 | 1091 |
| 63 | 1132 |
| 64 | 1173 |
| 65 | 1217 |
| 66 | 1262 |
| 67 | 1308 |
| 68 | 1356 |
| 69 | 1406 |
| 70 | 1458 |
| 71 | 1512 |
| 72 | 1568 |
| 73 | 1626 |
| 74 | 1685 |
| 75 | 1748 |
| 76 | 1812 |

TABLE 1-continued

| E-TFCI | TB Size (Bit) |
|---|---|
| 77 | 1879 |
| 78 | 1948 |
| 79 | 2020 |
| 80 | 2094 |
| 81 | 2172 |
| 82 | 2252 |
| 83 | 2335 |
| 84 | 2421 |
| 85 | 2510 |
| 86 | 2603 |
| 87 | 2699 |
| 88 | 2798 |
| 89 | 2901 |
| 90 | 3008 |
| 91 | 3119 |
| 92 | 3234 |
| 93 | 3353 |
| 94 | 3477 |
| 95 | 3605 |
| 96 | 3738 |
| 97 | 3876 |
| 98 | 4019 |
| 99 | 4167 |
| 100 | 4321 |
| 101 | 4480 |
| 102 | 4645 |
| 103 | 4816 |
| 104 | 4994 |
| 105 | 5178 |
| 106 | 5369 |
| 107 | 5567 |
| 108 | 5772 |
| 109 | 5985 |
| 110 | 6206 |
| 111 | 6435 |
| 112 | 6672 |
| 113 | 6918 |
| 114 | 7173 |
| 115 | 7437 |
| 116 | 7711 |
| 117 | 7996 |
| 118 | 8290 |
| 119 | 8596 |
| 120 | N/A |
| 121 | 9241 |
| 122 | 9582 |
| 123 | 9935 |
| 124 | 10302 |
| 125 | 10681 |
| 126 | 11075 |
| 127 | 11484 |

TABLE 2

| E-TFCI | TB Size (Bit) |
|---|---|
| 0 | 18 |
| 1 | 186 |
| 2 | 204 |
| 3 | 354 |
| 4 | 372 |
| 5 | 522 |
| 6 | 540 |
| 7 | 558 |
| 8 | 674 |
| 9 | 692 |
| 10 | 708 |
| 11 | 858 |
| 12 | 876 |
| 13 | 894 |
| 14 | 1026 |
| 15 | 1044 |
| 16 | 1194 |

TABLE 2-continued

| E-TFCI | TB Size (Bit) |
|---|---|
| 17 | 1212 |
| 18 | 1230 |
| 19 | 1330 |
| 20 | 1348 |
| 21 | 1362 |
| 22 | 1380 |
| 23 | 1530 |
| 24 | 1548 |
| 25 | 1566 |
| 26 | 1698 |
| 27 | 1716 |
| 28 | 1866 |
| 29 | 1884 |
| 30 | 1902 |
| 31 | 1986 |
| 32 | 2004 |
| 33 | 2034 |
| 34 | 2052 |
| 35 | 2370 |
| 36 | 2388 |
| 37 | 2642 |
| 38 | 2660 |
| 39 | 2706 |
| 40 | 2724 |
| 41 | 3042 |
| 42 | 3060 |
| 43 | 3298 |
| 44 | 3316 |
| 45 | 3378 |
| 46 | 3396 |
| 47 | 3750 |
| 48 | 3990 |
| 49 | 4086 |
| 50 | 4422 |
| 51 | 4646 |
| 52 | 4758 |
| 53 | 5094 |
| 54 | 5302 |
| 55 | 5430 |
| 56 | 5766 |
| 57 | 5958 |
| 58 | 6102 |
| 59 | 6438 |
| 60 | 6614 |
| 61 | 6774 |
| 62 | 7110 |
| 63 | 7270 |
| 64 | 7446 |
| 65 | 7782 |
| 66 | 7926 |
| 67 | 8118 |
| 68 | 8454 |
| 69 | 8582 |
| 70 | 8790 |
| 71 | 9126 |
| 72 | 9238 |
| 73 | 9462 |
| 74 | 9798 |
| 75 | 9894 |
| 76 | 10134 |
| 77 | 10470 |
| 78 | 10550 |
| 79 | 10806 |
| 80 | 11160 |
| 81 | 11224 |
| 82 | 11496 |
| 83 | 11880 |
| 84 | 12168 |
| 85 | 12536 |
| 86 | 12840 |
| 87 | 13192 |
| 88 | 13512 |
| 89 | 13848 |
| 90 | 14184 |
| 91 | 14538 |
| 92 | 14874 |
| 93 | 15210 |

TABLE 2-continued

| E-TFCI | TB Size (Bit) |
|---|---|
| 94 | 15546 |
| 95 | 15882 |
| 96 | 16218 |
| 97 | 16554 |
| 98 | 16890 |
| 99 | 17226 |
| 100 | 17562 |
| 101 | N/A |
| 102 | N/A |
| 103 | 18252 |
| 104 | 18476 |
| 105 | 18588 |
| 106 | 18924 |
| 107 | 19132 |
| 108 | 19260 |
| 109 | 19596 |
| 110 | 19788 |
| 111 | 19932 |
| 112 | 20268 |
| 113 | 20444 |
| 114 | 20604 |
| 115 | 20940 |
| 116 | 21100 |
| 117 | 21276 |
| 118 | 21612 |
| 119 | 21774 |
| 120 | 21966 |
| 121 | 22302 |
| 122 | 22430 |
| 123 | 22638 |
| 124 | 22996 |

Therefore, when receiving the switching indication information from the base station, for example, the base station requires the UE to switch from the 2-ms TTI to the 10-ms TTI, the UE may send the E-TFCI corresponding to the TB, which is forbidden to be used within the 2-ms TTI, on the E-DPCCH. For example, the UE confirms with the base station that the switching indication information is received and notify all the base stations (including base stations in a serving cell and base stations in a non-serving cell) communicating with the UE that the UE is to switch from the 2-ms TTI to the 10-ms TTI, by using E-TFCI=120 in Table 1 or by using E-TFCI=101 or E-TFCI=102 in Table 2. The base station receives the E-TFCI corresponding to the TB, which is forbidden to be used, after sending the switching indication information to the UE. Therefore, the base station does not mistake the E-TFCI sent on the E-DPCCH as incorrect.

At this time, the UE stops data transmission on an E-DCH dedicated physical data channel (E-DPDCH). The power of the disabled E-DPDCH may be allocated to the E-DPCCH to prevent a case that the base station incorrectly detects or fails to detect the E-DPCCH, so as to further ensure that the base station can correctly demodulate the E-DPCCH. The UE may send the same E-TFCI multiple times within a plurality of continuous TTIs on the E-DPCCH to ensure that the base station receives the E-TFCI correctly. At this time, the base station does not need to feed back an acknowledgement (ACK) or non-acknowledgement (NACK) message. When the times of sending the E-TFCI is determined, it may be preferably considered that the UE can be enabled to consecutively send five subframes or multiple-of-five subframes at the start position of a connection frame number (CFN), and then switch to the 10-ms TTI on the boundary of a next CFN. As long as the base station receives the E-TFCI corresponding to the TB, which is forbidden to be used, within a CFN, the base station considers by default that the UE switches to the 10-ms TTI in the next CFN. Accordingly, the UE can switch the TTI quickly to enhance the uplink coverage rapidly.

Figure 2:
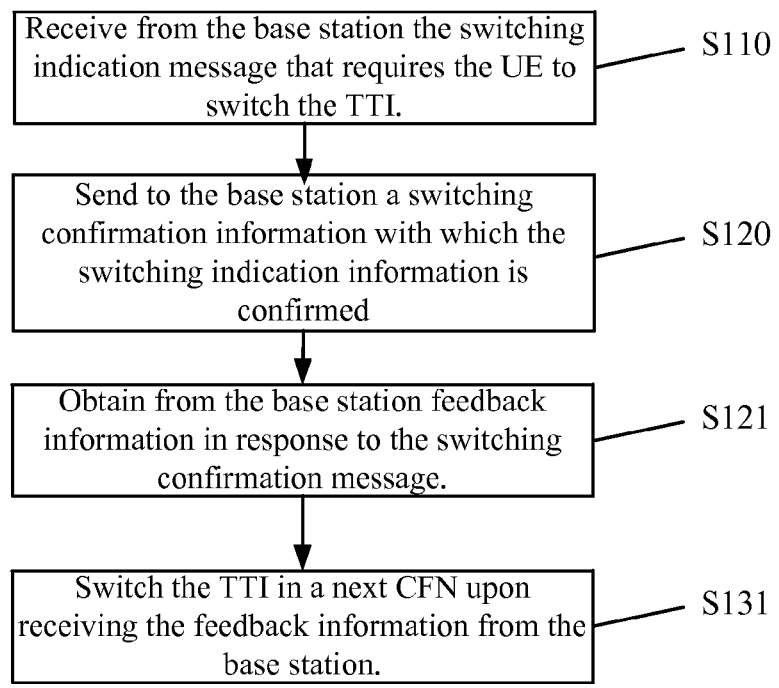
FIG. 2 is a flowchart of a method for switching according to another embodiment of the present invention.

In step S120 of the embodiment of the present invention, the UE may also carry the switching confirmation information by adding an indicator to the media access control (MAC) header or scheduling information of the E-DPDCH. In this case, as shown in FIG. 2, the switching method according to the embodiment of the present invention, after step S120, may further include step S121: obtaining from the base station feedback information in response to the switching confirmation information. Step S130 includes step S131: after receiving the feedback information from the base station, switching the TTI in a next CFN.

For example, when the base station requires the UE to switch from the 2-ms TTI to the 10-ms TTI, the MAC header or scheduling information of the E-DPDCH may include the indicator carrying the switching confirmation information to confirm that the switching confirmation information is received and the TTI is to be switched. The indicator may be divided into two parts, that is, the indicator includes message type and content, or only includes several bits. For example, indicator P includes one bit. It may be defined that "P=1" indicates that switching is performed; and "P=0" indicates that switching is not performed.

The UE may also add an indicator to the MAC header or scheduling information within a plurality of continuous TTIs on the E-DPDCH to ensure that the base station correctly receives data. In this case, the UE needs to wait for the ACK or NACK message fed back from the base station. After receiving a last ACK or NACK message from the base station, the UE switches from the 2-ms TTI to the 10-ms TTI in a next CFN. Accordingly, the UE can switch the TTI quickly to enhance the uplink coverage rapidly.

In step S130 of the embodiment of the present invention, switching the TTI includes: obtaining reconfiguration resources for switching the TTI and switching the TTI in a next CFN, where the reconfiguration resources for the UE to switch the TTI are resources may be issued by the RNC to the UE in broadcast mode. Preferably, the reconfiguration resources for the UE to switch the TTI may be stored in the UE as default resources, so as to facilitate quick TTI switching and improve the uplink coverage.

Figure 3:
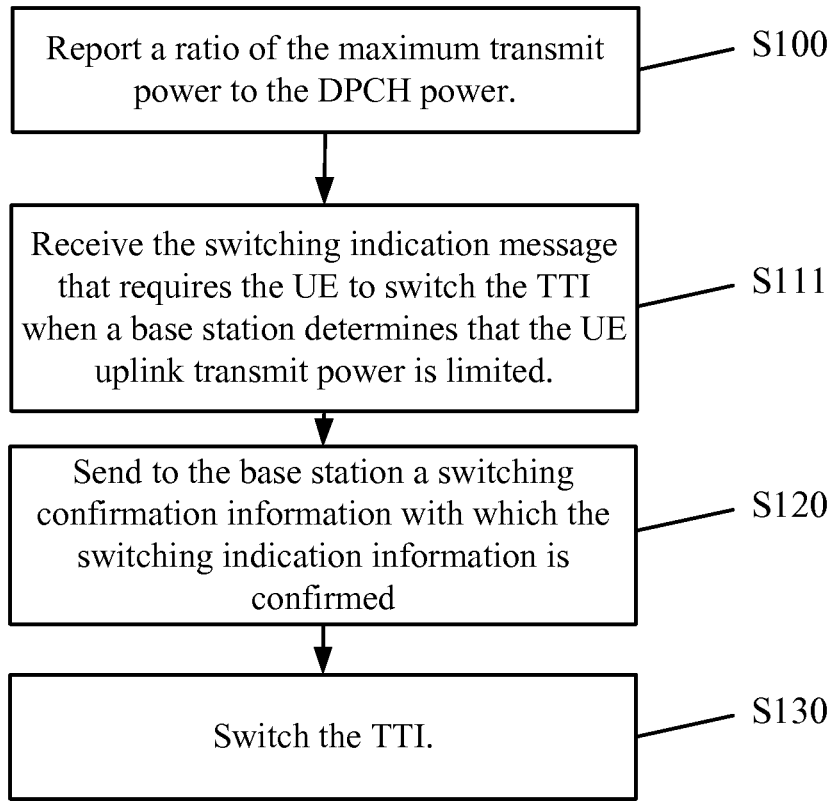
FIG. 3 is a flowchart of a method for switching according to still another embodiment of the present invention.

In another embodiment of the present invention, a switching method of switching the TTI, before step S110, may include step S100: reporting a ratio of the UE maximum transmit power to the dedicated physical control channel (DPCH) power, where the ratio of the UE maximum transmit power to the dedicated physical control channel (DPCH) power is used by the base station to determine whether UE uplink transmit power is limited. Step S110 may include step S111: receiving the switching indication information sent by the base station when the base station determines that the UE uplink transmit power is limited, as shown in FIG. 3.

Preferably, the base station uses the ratio of the UE maximum transmit power to the dedicated physical control channel (DPCH) power (UE power headroom (UPH)) reported by the UE to determine whether the UE uplink transmit power is limited. The base station may calculate the UE maximum transmit power according to the UPH provided by the UE. If the maximum transmit power exceeds the maximum power configured by the RNC to the UE, the base station determines that the UE power is limited. Accordingly, the UE needs to switch from the 2-ms TTI to the 10-ms TTI to enhance the uplink coverage.

Figure 4:
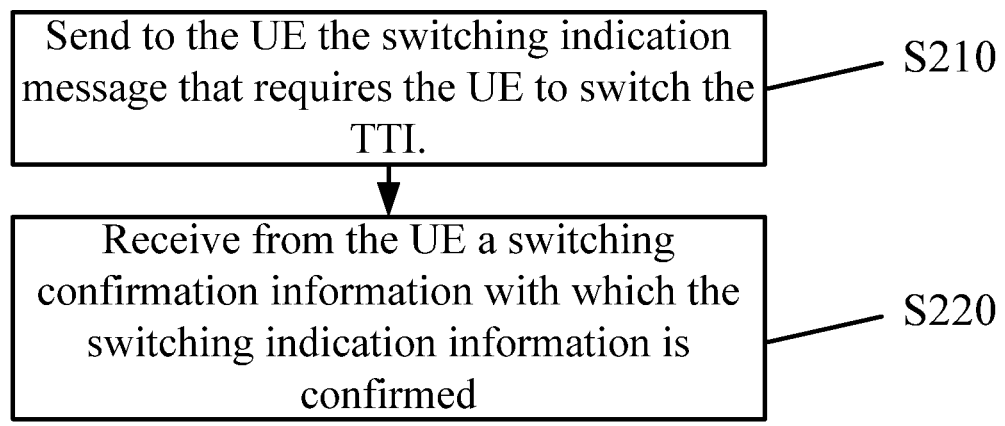
FIG. 4 is a flowchart of a method for switching according to an embodiment of the present invention.

As shown in FIG. 4, an embodiment of the present invention also provides a switching method. The method includes:

Step S210: Send to a UE a switching indication information that requires a UE to switch a TTI.

Step S220: Receive from the UE a switching confirmation information with which the switching indication information is confirmed.

The base station directly instructs the UE to switch the TTI. Therefore, the notification sent from the Node B to RNC to instruct UE to switch the TTI is avoided. The delay of switching the TTI is shortened so as to hence implement quick TTI switching.

In step S220 of the embodiment of the present invention, the switching confirmation information received by the base station may be sent by the UE through the E-TFCI corresponding to the TB, which is forbidden to be used within the current TTI, on the E-DPCCH, or may be sent by adding the indicator to the MAC header or scheduling information of the E-DPDCH. When the base station receives the switching confirmation information sent by the UE by adding the indicator to the MAC header or scheduling information of the E-DPDCH, the switching method according to the embodiment of the present invention, after step S220, may include step S230: sending feedback information in response to the switching conformation information to the UE. Upon receiving the ACK or NACK message, the UE switches the TTI in a next CFN.

Figure 5:
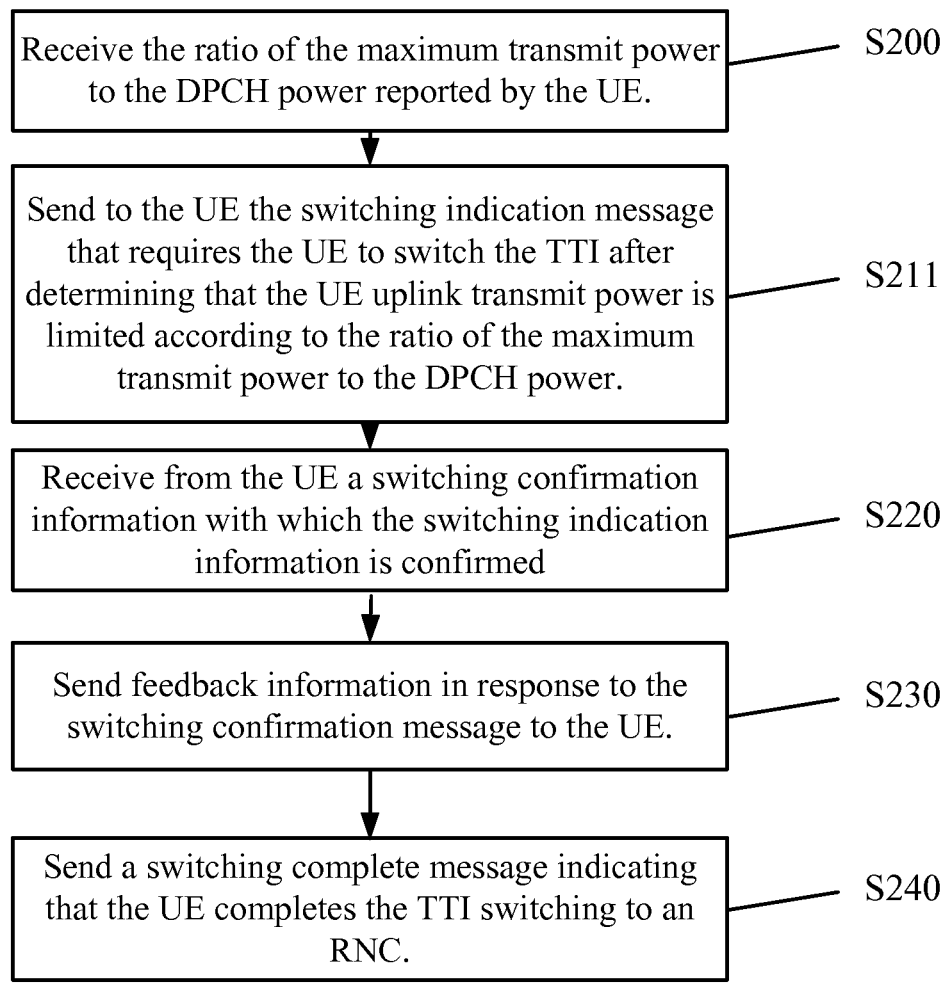
FIG. 5 is a flowchart of a method for switching according to another embodiment of the present invention.

As shown in FIG. 5, in another embodiment of the present invention, the switching method of switching the TTI, before step S120, may include step S200: receiving a ratio of the maximum transmit power to the dedicated physical control channel (DPCH) power reported by the UE. Step S210 may include step S211: sending to the UE the switching indication information that requires the UE to switch the TTI after determining that the UE uplink transmit power is limited according to the ratio of the maximum transmit power to the dedicated physical control channel (DPCH) power. In step S211, the base station may carry the switching indication information by issuing an HS-SCCH order or by using other methods.

In still another embodiment of the present invention, the switching method of switching the TTI, after step S220, may include step S240: sending to the RNC a switching complete information indicating that the UE completes the TTI switching. After the UE completes the TTI switching, the base station may send to the RNC the switching complete information indicating that the UE completes the TTI switching so as to make preparation for communication within the switched TTI. Preferably, the base station carries the switching complete information by issuing Node B Application Part signaling (NBAP) signaling.

Therefore, with the switching method according to embodiments of the present invention, the delay of switching the TTI can be effectively shortened, so as to implement quick TTI switching and enhance the UE uplink coverage rapidly. In addition, according to embodiments of the present invention, network resources can be fully used and different manners are used to send the switching confirmation information to the base station quickly and conveniently.

The following describes an embodiment of a UE that performs TTI switching and an embodiment of a base station that is used for switching the TTI. Similarly, the UE and base station according to embodiments of the present invention can effectively shorten the delay of switching the TTI and complete quick TTI switching by using the switching method described in the preceding embodiments.

Figure 6:
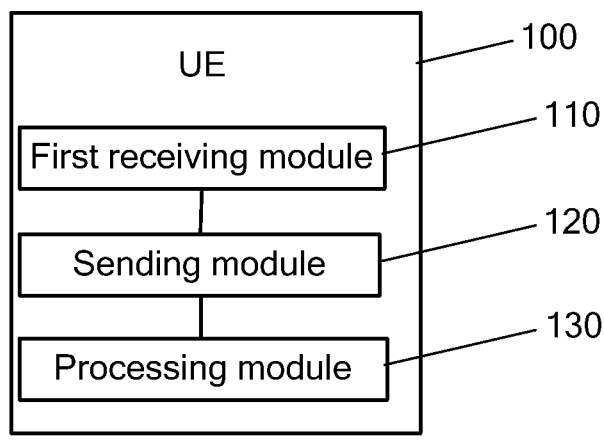
FIG. 6 is a structure schematic diagram of a UE according to an embodiment of the present invention.

Referring to FIG. 6, a UE 100 of an embodiment of the present invention include: a first receiving module 110, a sending module 120, and a processing module 130. The first receiving module 110 is configured to receive from a base station a switching indication information that requires switching a TTI. The sending module 120 is configured to send to the base station a switching confirmation information with which the switching indication information is confirmed information. The processing module 130 is configured to switch the TTI.

Accordingly, the UE can effectively shorten the delay of switching the TTI, so as to complete the TTI switching quickly and enhance the uplink coverage.

Figure 7:
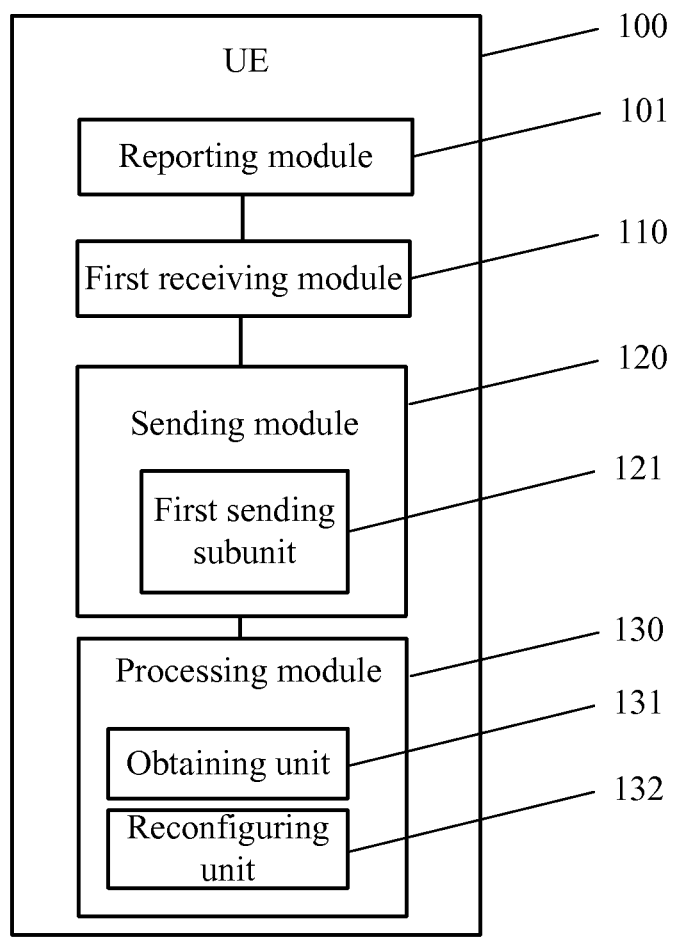
FIG. 7 is a structure schematic diagram of a UE according to another embodiment of the present invention.
Figure 8:
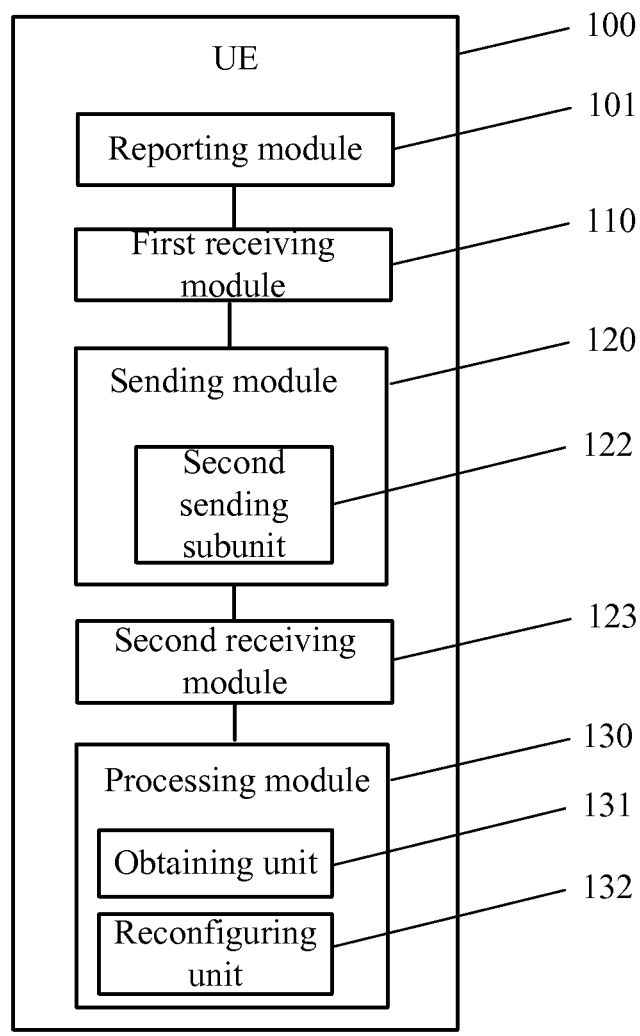
FIG. 8 is a structure schematic diagram of a UE according to still another embodiment of the present invention.

In another embodiment of the present invention, as shown in FIG. 7 and FIG. 8, the UE 100 may further include: a reporting module 101, configured to report a ratio of the UE 100 maximum transmit power to the dedicated physical control channel (DPCH) power, where the ratio of the maximum transmit power to the dedicated physical control channel (DPCH) power is used by the base station to determine whether the UE 100 uplink transmit power is limited. The first receiving module 110 is configured to receive the switching indication information sent by the base station when the base station determines that the UE 100 uplink transmit power is limited.

In the embodiment of the present invention, the sending module 120 may include: a first sending subunit 121, configured to send the switching confirmation information to the base station through an E-TFCI corresponding to a TB, which is forbidden to be used within a current TTI, on an E-DPCCH, as shown in FIG. 7. The sending module 120 may further include: a second sending subunit 122, configured to send the switching confirmation information to the base station by adding an indicator to a MAC header or scheduling information of an E-DPDCH. The sending module 120 may also further include both a first sending subunit 121 and a second sending subunit 122, configured to send to the base station the switching confirmation information with which the switching indication information is confirmed.

When the sending module 120 includes the second sending subunit 122, the UE 100 may further include: a second receiving module 123 configured to receive from the base station feedback information in response to the switching confirmation information. The processing module 130 switches the TTI when the second receiving module 123 receives the feedback information.

In the embodiment of the present invention, as shown in FIG. 7 and FIG. 8, the processing module 130 may include an obtaining unit 131 and a reconfiguring unit 132. The obtaining unit 131 is configured to obtain reconfiguration resources for switching the TTI. The reconfiguring unit 132 is configured to reconfigure the TTI according to the reconfiguration resources. Preferably, the reconfiguration resources are broadcasted by an RNC; or more preferably, the reconfiguration resources are default reconfiguration resources stored in the UE 100.

Figure 9:
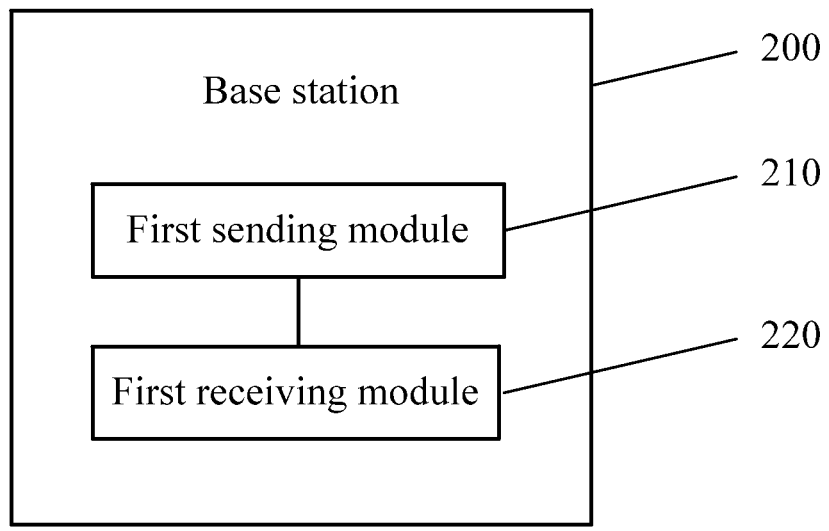
FIG. 9 is a structure schematic diagram of a base station according to an embodiment of the present invention.

Referring to FIG. 9, a base station 200 of an embodiment of the present invention includes: a first sending module 210, configured to send to a UE 100 a switching indication information that requires the UE 100 to switch a TTI; and a first receiving module 220, configured to receive from the UE100 a switching confirmation information with which the switching indication information is confirmed.

Figure 10:
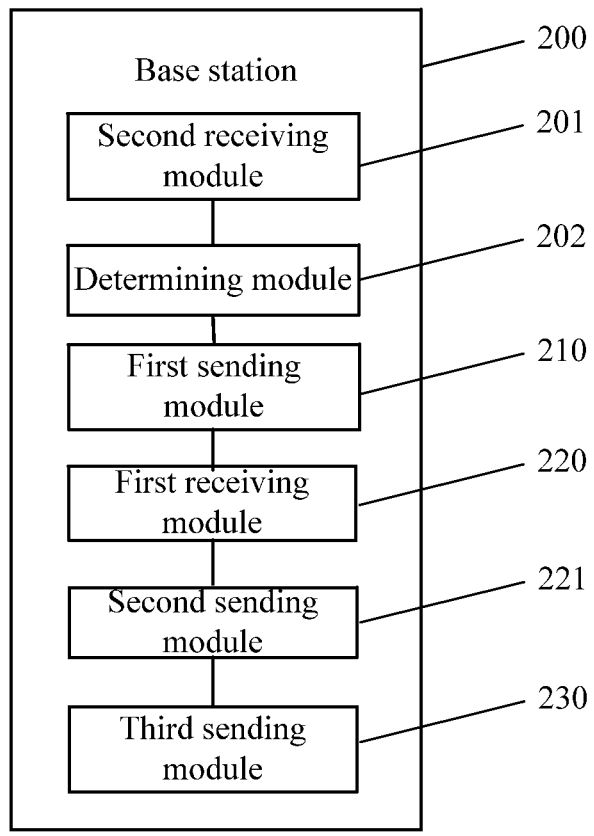
FIG. 10 is a structure schematic diagram of a base station according to another embodiment of the present invention.

In the preceding embodiment, as shown in FIG. 10, the base station 200 may further include a second receiving module 201 and a determining module 202. The second receiving module 201 is configured to receive a ratio of maximum transmit power to the dedicated physical control channel (DPCH) power reported by the UE 100. The determining module 202 is configured to determine whether the UE 100 uplink transmit power is limited according to the ratio of maximum transmit power to the dedicated physical control channel (DPCH) power. When the UE 100 uplink transmit power is limited, the first sending module 210 is configured to send to the UE 100 the switching indication information of switching the TTI. Preferably, the first sending module 210 sends the switching indication information to the UE 100 through an HS-SCCH order.

In another embodiment of the present invention, the base station 200 may further include a second sending module 221, configured to send feedback information in response to the switching confirmation information to the UE 100 when the first receiving module 220 receives the switching confirmation information that is sent by the UE 100 by adding an indicator to a MAC header or scheduling information of an E-DPDCH. The UE 100 switches the TTI in a next CFN after receiving the last ACK or NACK message from the base station 200.

In yet another embodiment of the present invention, the base station 200 may further include a third sending module 230, configured to send to an RNC a switching complete information indicating that a UE 100 completes the TTI switching. Preferably, the third sending module 230 sends the switching complete information to the RNC through NBAP signaling.

Therefore, with the switching method according to embodiments of the present invention, the delay of switching the TTI can be effectively shortened, so as to quickly complete the TTI switching and enhance the UE uplink coverage rapidly. In addition, according to embodiments of the present invention, network resources can be fully used and different manners are used to send the switching confirmation information to the base station quickly and conveniently.

It is understandable to those skilled in the art that the all or a part of steps of the communication method according to the embodiments of the present invention can be implemented by programs instructing relevant hardware. The programs may be stored in a computer readable storage medium. When the programs runs, the corresponding steps in the communication method are executed. The storage medium may be a read only memory (ROM), random access memory (RAM), a magnetic disk or a compact disk.

Although the present invention is described with reference to the accompanying drawings and in combination with exemplary embodiments, the present invention is not limited thereto. Those skilled in the art may make various equivalent modifications and refinements without departing from the principle and the spirit of the present invention, and modifications and refinements should fall within the protection scope of the present invention.

What is claimed is:

1. A non-transitory computer readable storage medium storing programming for execution by a processor, the programming comprising instructions to:
   receive a high-speed shared control channel (HS-SCCH) order carrying a switching indication information instructing a user equipment (UE) to switch a transmission time interval (TTI), wherein the switching indication information is received from a base station;
   send to the base station a switching confirmation information, wherein the switching indication information is confirmed with the switching confirmation information; and
   switch the TTI.

2. The non-transitory computer readable storage medium according to claim 1, wherein the instructions to send to the base station the switching confirmation information comprises instructions to:
   send the switching confirmation information to the base station through a transport format combination indicator (TFCI) corresponding to a transport block (TB), on an enhanced dedicated channel (E-DCH) dedicated physical control channel (E-DPCCH), wherein the TB is configured to be forbidden within a current TTI.

3. The non-transitory computer readable storage medium according to claim 1, wherein the instructions to send to the base station the switching confirmation information comprises instructions to:
   send the switching confirmation information to the base station by adding an indicator to a media access control (MAC) header or scheduling information of an enhanced dedicated channel (E-DCH) dedicated physical data channel (E-DPDCH).

4. The non-transitory computer readable storage medium according to claim 1, wherein the programming further comprises instructions to report a ratio of UE maximum transmit power to dedicated physical control channel (DPCH) power, wherein the ratio of the UE maximum transmit power to the dedicated physical control channel (DPCH) power is configured to be used by the base station to determine whether to limit the UE uplink transmit power,
   wherein the instructions to receive the switching indication information comprises instructions to receive the switching indication information sent by the base station if the base station determines that the UE uplink transmit power is limited.

5. The non-transitory computer readable storage medium according to claim 1, the programming further includes instructions to obtain from the base station feedback information in response to the switching confirmation information,
   wherein the instructions to switch the TTI comprises instructions to switch the TTI at a next connection frame number (CFN) upon receiving the feedback information from the base station.

6. The non-transitory computer readable storage medium according to claim 1, wherein the instructions to switch the TTI includes instructions to obtain reconfiguration resources and to switch the TTI in the next CFN in accordance with the reconfiguration resources.

7. The non-transitory computer readable storage medium according to claim 6, wherein the reconfiguration resources are broadcasted by a radio network controller (RNC).

8. The non-transitory computer readable storage medium according to claim 6, wherein the reconfiguration resources are default reconfiguration resources stored in the UE.

9. A non-transitory computer readable storage medium storing programming for execution by a processor, wherein the programming comprises instructions to:
   send a high-speed shared control channel (HS-SCCH) order from a base station to a user equipment (UE), the HS-SCCH order carrying a switching indication information instructing the UE to switch a transmission time interval (TTI); and
   receive from the UE a switching confirmation information confirming that the UE has switched the TTI.

10. The non-transitory computer readable storage medium according to claim 9, wherein the instructions to receive the switching confirmation information comprises instructions to:

receive the switching confirmation information from the base station through a E-DCH transport format combination indicator (E-TFCI) corresponding to a transport block (TB), which is forbidden to be used within a current TTI, on an enhanced dedicated channel (E-DCH) dedicated physical control channel (E-DPCCH).

11. The non-transitory computer readable storage medium according to claim 9, wherein the instructions to receive the switching confirmation information comprises instructions to:

receive the switching confirmation information from the UE by adding an indicator to a media access control (MAC) header.

12. The non-transitory computer readable storage medium according to claim 9, wherein the instructions to receive the switching confirmation information comprises instructions to:

receive the switching confirmation information from the UE by scheduling the switching confirmation information to be carried on an enhanced dedicated channel (E-DCH) dedicated physical data channel (E-DPDCH).

13. The non-transitory computer readable storage medium according to claim 9, wherein the programming further comprises instructions to:

receive a ratio of maximum transmit power to dedicated physical control channel (DPCH) power reported by the UE; and using the ratio of the maximum transmit power to the DPCH power to determine whether to limit UE uplink transmit power, wherein the instructions to send to the UE the switching indication information that requires the UE to switch the TTI comprises instructions to send the switching indication information to the UE after determining to limit the UE uplink transmit power according to the ratio of the maximum transmit power to the DPCH power reported by the UE.

14. The non-transitory computer readable storage medium according to claim 9, wherein the programming further comprises instructions to:

send feedback information in response to the switching confirmation information to the UE after receiving from the UE the switching confirmation information.

15. The non-transitory computer readable storage medium according to claim 9, wherein the programming further comprises instructions to:

send a switching complete information to a radio network controller (RNC) after receiving the switching confirmation information from the UE, the switching complete instruction indicating that the UE has switched the TTI.

16. The non-transitory computer readable storage medium according to claim 15, wherein the instructions to send the switching complete information to the RNC comprises instructions to:

send the switching complete information to the RNC through Node B Application Part (NBAP) signaling.

* * * * *